United States Patent

[11] 3,579,770

[72] Inventors William H. O'Mara
New Bedford;
Owen J. Wood, Mattapoisett, Mass.
[21] Appl. No. 861,824
[22] Filed Sept. 29, 1969
Division of Ser. No. 743,787, July 10, 1968,
Pat. No. 3,522,493
[45] Patented May 25, 1971
[73] Assignee Aerovox Corporation
New Bedford, Mass.

[54] METHOD OF FORMING TUBULAR MICA CAPACITOR
2 Claims, 3 Drawing Figs.

[52] U.S. Cl. .................................................. 29/25.42,
53/36, 53/37
[51] Int. Cl. ...................................................... H01g 13/00
[50] Field of Search ........................................... 29/25.41,
25.42, 588; 53/36, 37

[56] References Cited
UNITED STATES PATENTS

| | | | |
|---|---|---|---|
| 2,047,273 | 7/1936 | Kopinski | 53/36X |
| 2,478,754 | 8/1949 | Dubilier et al. | 53/36X |
| 2,943,359 | 7/1960 | Sussman | 29/588X |
| 3,036,249 | 5/1962 | Hall | 29/25.41X |
| 3,072,831 | 1/1963 | Kurland et al. | 29/25.42X |
| 3,250,969 | 5/1966 | Fanning | 29/25.42X |
| 3,271,221 | 9/1966 | Sheehan | 29/25.42X |
| 3,279,038 | 10/1966 | Coper | 29/588X |
| 3,439,395 | 4/1969 | Claypoole et al. | 29/25.42 |

Primary Examiner—John F. Campbell
Assistant Examiner—Richard Bernard Lazarus
Attorney—Arthur B. Colvin ABSTRACT: This disclosure relates to the art of electric capacitors of the mica type and more particularly relates to a method of forming a capacitor comprising a rigid tubular member of insulating material in which is positioned a substantially rectangular mica capacitor section that is retained in fixed position with terminal leads protruding from opposed ends of the tubular member by filling the latter with a thermosetting resin.

PATENTED MAY 25 1971 3,579,770
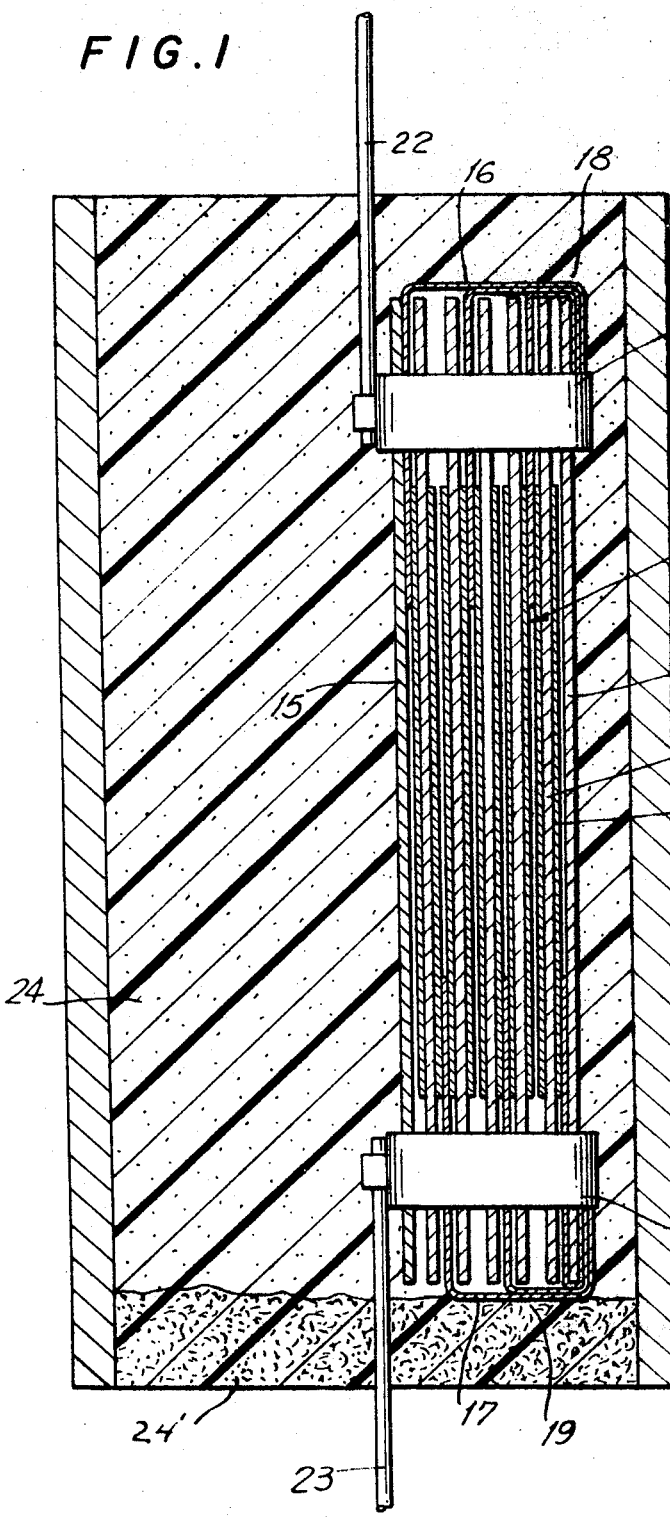
FIG.1
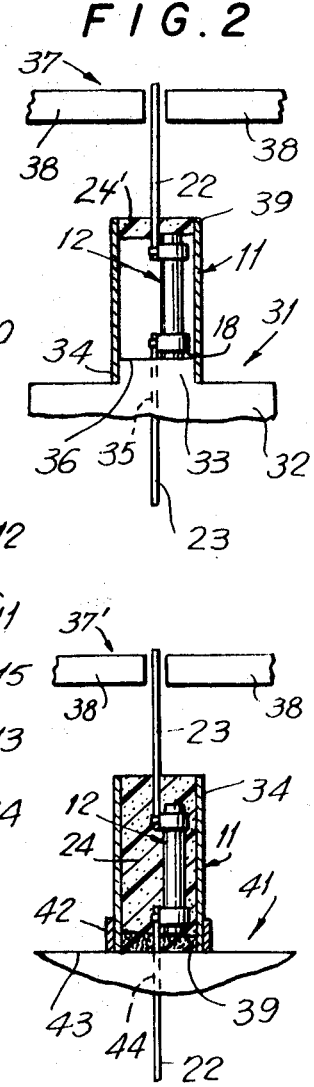
FIG.2
FIG.3
INVENTOR
WILLIAM H. O'MARA
OWEN J. WOOD
By Art J Colvin
ATTORNEY

METHOD OF FORMING TUBULAR MICA CAPACITOR

This application is a division of copending application Ser. No. 743,787, filed July 10, 1968 now U.S. Pat. No. 3,522,493.

As conducive to an understanding of the invention, it is noted that in many cases because of their operating characteristics, mica capacitors are desired. Such capacitors having a long life and a high safety factor.

However, due to the fact that it is preferred because of their superior electrical characteristics, to use natural mica sheets as the dielectric of the capacitor, since these sheets are extremely brittle, they cannot be rolled and hence capacitors which use natural mica sheets as the dielectric are generally rectangular in shape and substantially in the form of a parallelapiped.

Since, in the present state of technology, automatic material handling machines are best able to feed tubular members, the rectangular form of the conventional mica capacitor renders them difficult to be handled and fed automatically at a high rate of speed.

Where attempts are made to encapsulate the mica capacitor section by molding, so that the resultant configuration will be tubular, since molding techniques require the exertion of a high degree of pressure, the relatively brittle mica plates or sheets often tend to crack thereby rendering the capacitor useless for its intended purpose.

Furthermore, due to the pressure exerted in the molding operation, the internal mica section tends to shift with the result that it is not uniformly enclosed by the external molding material and in many cases there is a relatively thin layer of molding material on one side or end of the capacitor section with the result that it is susceptible to humidity, therefore affecting the effectiveness of the capacitor.

In addition to the foregoing, under the pressure exerted during the molding operation, the capacitor section tends to bow and where the ends of the section are retained together by crimping, such crimped ends may be opened with resultant failure of electrical connections.

Furthermore, the bowing of the capacitor section under molding pressure may change the characteristics of the capacitor which is undesirable. In addition to the foregoing, where foil is interposed between adjacent layers of mica, the use of pressure during molding may cause the foil to move away from the mica with resultant high resistance connection.

In addition, the molding powder can be forced laterally between the mica sheets under the relatively high pressures used in molding, thereby causing cracking of the mica and breakdown of the capacitor. Furthermore, it is necessary that the terminal leads extending from the capacitor section be carefully aligned in grooves in the mold in order that they extend axially from the molded unit to permit subsequent automatic handling thereof. This procedure is time-consuming since it requires each section to be individually handled and often the leads are not straight which is also undesirable.

Where the mica capacitor sections are dipped into a suitable coating material in order to cover the same, it is difficult to form a uniformly cylindrical unit and the relatively thin walls at the ends of the capacitor break off as the capacitor leads are handled, possibly opening a path for moisture into the capacitor section.

It is accordingly among the objects of the invention to provide a tubular mica capacitor which may readily be manufactured at low cost with assurance that the unit will be truly cylindrical in configuration with terminal leads extending axially therefrom and without any possibility of excessive pressure being applied to the mica section during fabrication of the tubular capacitor which might cause cracking of said mica with resultant failure of the unit.

According to the invention, these objects are accomplished by the arrangement and combination of elements hereinafter described and more particularly recited in the claims.

In the accompanying drawings in which is shown one of various possible embodiments of the several features of the invention;

FIG. 1 is a longitudinal sectional view of a tubular mica capacitor according to the invention, and FIGS. 2 and 3 are diagrammatic views illustrating steps in the manufacture of said tubular capacitor.

Referring now to the drawings, as shown in FIG. 1, the mica capacitor comprises a cylindrical casing or tube 11 of suitable insulating material such as polyethylene. The tube 11 is of internal diameter greater than the width of the mica capacitor section 12 to be positioned therein and is of length greater than the length of said section 12.

As shown in FIG. 1, the capacitor section 12 comprises a plurality of superimposed mica sheets 13 each of which has a silver coating 14 applied to opposed surfaces thereof with an insulating plate 15 being positioned on opposed faces of the superimposed mica sheets. Alternate silvered surfaces 14 have foil electrodes 16, 17 secured thereto, said electrodes being so arranged at each end 18, 19 of the capacitor section 12 as to connect alternate plates in parallel. The silvered mica plates are clamped together by means of suitable metal bands or straps 20, 21 crimped around the ends 18, 19 of the capacitor section and also encompassing the foil electrodes 16, 17 at said ends. Terminal leads 22 and 23 connected at one end respectively to each of said bands 20, 21 extend outwardly from the ends of said capacitor section 12, said leads being longitudinally aligned as shown.

The capacitor section is positioned in the bore of the tube 11 and retained in position so that the terminal leads extend axially outwardly in opposed direction from said tube 11. Thereupon, the tube 11 is filled with a suitable insulating material such as an epoxy resin 24 to completely encapsulate the capacitor section 12 on its sides and ends with a uniform thickness of resin along the length of the section 12.

According to one illustrative embodiment of the invention, to assemble the capacitor, a suitable jig 31 is provided as shown in FIG. 2 which comprises a plate 32 that has a cylindrical boss 33 of external diameter just slightly less than the internal diameter of the insulating tube 11 so that the end 34 of the latter may encompass said boss 33 and be retained in upright position. The boss 33 has an axial bore 35 into which the terminal lead 23, for example, may be positioned with the end 18 of the capacitor section 12 resting on the top surface 36 of said boss. The height of boss 33 is such that when the end 18 of the capacitor section rests thereagainst the other end 19 will be spaced from the end 39 of the tube by the same distance that end 18 is spaced from end 34 of the tube. Thus, the capacitor section is longitudinally centered in the tube for the reason hereinafter set forth. A suitable clamp 37 comprising for example, two horizontally movable members 38 are adjusted to clamp the terminal lead 22 therebetween, said terminal lead 22 protruding beyond the upper end 39 of the tube 11. Thus, by reason of the axial bore 35 in the jig 31 and the clamping members 38, the terminal leads 22, 23 are retained in vertically aligned position axially of tube 11, with each of the sidewalls of the capacitor section uniformly spaced along their length from the wall of the tube and with the capacitor section 12 longitudinally centered in the tube 11.

Thereupon, the upper end of tube 11 is filled with a suitable thixotropic resin 24 which will form a cap 24' in the upper end 39 of tube 11. Such a resin is used to prevent flow down the tube which could fill the bore 35 and thus prevent removal of the lead 23 therefrom. In addition, it is a characteristic of such a resin to level out at its outer surface so that there is assurance that the end 39 of the tube 11 will be completely sealed. The resin is then cured so that it will set.

The capacitor unit is then removed from the jig 31 and inverted and positioned on a second jig 41. This second jig which is shown in FIG. 3 comprises a cylindrical holder 42 rising from a surface 43, said holder being of inner diameter just slightly less than the outer diameter of the end 39 of tube 11 so that it may retain the latter in upright position, said surface having a bore 44 therein axially aligned with respect to said cylindrical holder 42 to accommodate said terminal lead 22. A clamp 37' similar to clamp 37 is used to hold the lead 23 in axial alignment with lead 22. To complete the assembly of the capacitor, it is merely necessary to fill the interior of the tube 11 with a suitable resin and cure the same.

As the result of the method above-described, the capacitor section 12 will be completely encapsulated in the epoxy resin 24 and retained in position in the tube 11 with the terminal leads 22 and 23 extending axially from the tube 11 in opposed direction and with the entire sides and ends of the section 12 completely encapsulated and with a relatively thick uniform layer of resin 24 between the ends of the section and the ends of the tube which insures that no moisture will penetrate through the ends of the tube 11.

With the method above-described, a completely encapsulated tubular mica capacitor is provided without the application of any molding pressure being exerted against the capacitor section and with assurance that the terminal leads will extend axially from opposed ends of the assembled unit and with further assurance that the capacitor section will have relatively thick layers of insulating material between the ends thereof and the exterior.

As many changes could be made in the above method and construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

We claim:

1. The method of forming a tubular mica capacitor having a substantially rectangular capacitor section with oppositely extending terminal leads and a tubular outer casing, which comprises the steps of positioning one end of the tubular casing on an associated cylindrical boss so as to rise vertically therefrom, positioning the capacitor section completely in the casing with the lower one of the terminal leads of the capacitor section in an axial opening in the boss, supporting the other terminal lead of the capacitor section extending from the upper end of the tubular casing so that the two terminal leads are vertically aligned, capping the upper end of the tubular casing with a suitable thixotropic resin, curing said resin, then inverting the capped tube and supporting the latter in upright position and filling the interior of the tube with a suitable insulating material to encapsulate the capacitor section and then curing the same.

2. The method set forth in claim 1 in which the terminal lead extending from the capped end of the capacitor is positioned in a vertical bore that is axially aligned with a cylindrical holder, the latter encompassing the end of the tube to retain the latter in vertical position.